US008701093B2

(12) United States Patent
Bates

(10) Patent No.: US 8,701,093 B2
(45) Date of Patent: Apr. 15, 2014

(54) EVENT MANAGEMENT IN A NON-STOP DEBUGGING ENVIRONMENT

(75) Inventor: Cary L. Bates, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 366 days.

(21) Appl. No.: 13/085,628

(22) Filed: Apr. 13, 2011

(65) Prior Publication Data

US 2012/0266138 A1 Oct. 18, 2012

(51) Int. Cl.
G06F 9/44 (2006.01)
G06F 11/00 (2006.01)

(52) U.S. Cl.
USPC ............................................ 717/129; 714/34

(58) Field of Classification Search
USPC ......................................................... 717/129
See application file for complete search history.

(56) References Cited

U.S. PATENT DOCUMENTS

| 5,506,967 | A | 4/1996 | Barajas et al. |
| 5,632,032 | A | 5/1997 | Ault et al. |
| 6,113,645 | A | 9/2000 | Benitz et al. |
| 6,378,124 | B1 * | 4/2002 | Bates et al. ................... 717/129 |
| 6,915,513 | B2 | 7/2005 | Duesterwald et al. |
| 7,020,871 | B2 | 3/2006 | Bernstein et al. |
| 7,178,145 | B2 | 2/2007 | Bono |
| 7,203,927 | B2 | 4/2007 | Al-Azzawe et al. |
| 7,774,787 | B2 | 8/2010 | Leino et al. |
| 7,779,390 | B1 | 8/2010 | Allavarpu et al. |
| 7,865,883 | B1 | 1/2011 | Sistare et al. |
| 7,992,133 | B1 | 8/2011 | Theroux et al. |
| 2002/0073401 | A1 | 6/2002 | Sangavarapu et al. |
| 2002/0124042 | A1 | 9/2002 | Melamed et al. |
| 2003/0009745 | A1 | 1/2003 | Bates et al. |
| 2003/0028862 | A1 | 2/2003 | Bates et al. |
| 2003/0131284 | A1 | 7/2003 | Flanagan et al. |
| 2005/0010678 | A1 | 1/2005 | Pugh et al. |
| 2005/0235264 | A1 | 10/2005 | Hines |
| 2005/0246691 | A1 | 11/2005 | Hsieh et al. |
| 2006/0143531 | A1 | 6/2006 | Kilian et al. |
| 2007/0260929 | A1 | 11/2007 | Liu et al. |
| 2007/0288939 | A1 | 12/2007 | Stall |
| 2008/0133977 | A1 | 6/2008 | Chun et al. |
| 2008/0134149 | A1 | 6/2008 | Bates et al. |
| 2009/0164976 | A1 * | 6/2009 | Gritter et al. ................... 717/127 |
| 2009/0320001 | A1 * | 12/2009 | Bates et al. ................... 717/129 |
| 2009/0327429 | A1 | 12/2009 | Hughes et al. |
| 2010/0064283 | A1 | 3/2010 | Pett |

(Continued)

OTHER PUBLICATIONS

Sidwell et al., "Non-Stop Multi-Threaded Debugging in GDB," Mentor Graphics, 2008, 12pg.*

(Continued)

Primary Examiner — Ryan Coyer
(74) Attorney, Agent, or Firm — Biggers Kennedy Lenart Spraggins, LLP; James R. Nock

(57) ABSTRACT

Event management in a non-stop debugging environment that includes a debugger configured to debug a multi-threaded debuggee, where encountering an event by one of the threads stops execution of only the one thread without concurrently stopping execution of other threads and event management includes: receiving, by the debugger, a user request to establish a dynamically disabled event that is disabled for all threads upon a stop in execution of any thread; establishing, by the debugger, the dynamically disabled event; identifying, by the debugger, a stop in execution of a particular thread; and disabling, by the debugger, the dynamically disabled event for all threads of the debuggee.

11 Claims, 5 Drawing Sheets

(56) References Cited

U.S. PATENT DOCUMENTS

| | | |
|---|---|---|
| 2010/0205377 A1 | 8/2010 | Moyer |
| 2010/0242026 A1 | 9/2010 | Bates et al. |
| 2012/0198002 A1 | 8/2012 | Goulart et al. |
| 2012/0210305 A1 | 8/2012 | Bates |
| 2012/0222008 A1 | 8/2012 | Bates |
| 2012/0266134 A1 | 10/2012 | Bates |
| 2012/0266138 A1 | 10/2012 | Bates |
| 2012/0266139 A1 | 10/2012 | Bates |
| 2012/0266140 A1 | 10/2012 | Bates |
| 2013/0067438 A1 | 3/2013 | Bates |
| 2013/0074041 A1 | 3/2013 | Bates |
| 2013/0074044 A1 | 3/2013 | Bates |
| 2013/0097589 A1 | 4/2013 | Bates |
| 2013/0097590 A1 | 4/2013 | Bates |
| 2013/0097591 A1 | 4/2013 | Bates |

OTHER PUBLICATIONS

Mark, D., et al., "Debugging" Chapter From, "More iPhone 3 Development, Tackling iPhone SDK 3," 2009, pp. 495-526, Apress. Online ISBN: 978-1-4302-2506-5.

Roberts, P., "Implementation and Evaluation of Data Breakpoint Schemes in an Interactive Debugger," Master's Thesis, Jun./Dec. 1996, pp. 1-96, Department of Computer Science, University of Utah. URL: http://www.google.com/url?sa=t&rct=j&q=&esrc=s&source=web&cd=2&ved=0CDwQFjAB&url=http%3A%2F%2Fciteseerx.ist.psu.edu%2Fviewdoc%2Fdownload%3Fdoi%3D10.1.1.44.7562%26rep%3Drep1%26type%3Dpdf&ei=szJjUaOiHonn2AWI-4GQBA&usg=AFQjCNHZQ_R-GOciQPzkpe8xT0vf7lyjxw&sig2=Tu8PX61jYYGiTmrE8Qju_w.

Harrow, Jr., J., "Runtime Checking of Multithreaded Applications with Visual Threads," K. Havelund, J. Penix, and W. Visser (Eds.): SPIN 2000, LNCS 1885, 2000, pp. 331-342, Springer-Verlag Berlin Heidelberg. URL: ftp://159.226.92.10/pub/netlib/spin/ws00/18850335.pdf.

Office Action, U.S. Appl. No. 13/028,269, Apr. 3, 2013, pp. 1-36.
Office Action, U.S. Appl. No. 13/674,165, Apr. 2, 2013, pp. 1-29.
Office Action, U.S. Appl. No. 13/033,925, Apr. 1, 2013, pp. 1-20.
Office Action, U.S. Appl. No. 13/674,235, Mar. 28, 2013, pp. 1-13.
Office Action, U.S. Appl. No. 13/085,725, Mar. 28, 2013, pp. 1-53.
Office Action, U.S. Appl. No. 13/674,397, Apr. 1, 2013, pp. 1-42.
Sidwell, et al., "Non-Stop Multi-Threaded Debugging in GDB", GCC Developers' Summit 2008, pp. 1-11, CodeSourcery Inc, Ottawa, Canada.
Office Action, U.S. Appl. No. 13/085,628, Jun. 12, 2013, pp. 1-33.
Office Action, U.S. Appl. No. 13/692,065, Jun. 14, 2013, pp. 1-27.
Office Action, U.S. Appl. No. 13/693,235, Aug. 29, 2013, pp. 1-17.
Office Action, U.S. Appl. No. 13/693,802, Jun. 7, 2013, pp. 1-14.
Final Office Action, U.S. Appl. No. 13/085,725, Oct. 2, 2013, pp. 1-30.
Final Office Action, U.S. Appl. No. 13/028,269, Oct. 7, 2013, pp. 1-19.
Final Office Action, U.S. Appl. No. 13/033,925, Oct. 4, 2013, pp. 1-24.
Final Office Action, U.S. Appl. No. 13/674,165, Oct. 7, 2013, pp. 1-14.
Final Office Action, U.S. Appl. No. 13/674,235, Oct. 3, 2013, pp. 1-19.
Final Office Action, U.S. Appl. No. 13/674,397, Oct. 3, 2013, pp. 1-21.
Final Office Action, U.S. Appl. No. 13/085,467, Oct. 10, 2013, pp. 1-17.
Notice of Allowance, U.S. Appl. No. 13/086,073, Oct. 10, 2013, pp. 1-11.
Final Office Action, U.S. Appl. No. 13/692,065, Oct. 10, 2013, pp. 1-13.
Final Office Action, U.S. Appl. No. 13/693,802, Oct. 11, 2013, pp. 1-12.

* cited by examiner

EVENT MANAGEMENT IN A NON-STOP DEBUGGING ENVIRONMENT

BACKGROUND OF THE INVENTION

1. Field of the Invention

The field of the invention is data processing, or, more specifically, methods, apparatus, and products for event management in a non-stop debugging environment.

2. Description of Related Art

Software source code is increasingly complex and execution of such software may be multi-threaded. Software development is evolving to provide enhanced methods of debugging multi-threaded software applications. In traditional debugging, an event encountered by any one thread stops execution of all threads of the multi-threaded solution. This form of debugging may be referred to as 'all-stop' debugging. In contrast to all-stop debugging, the enhanced multi-threaded debugging enables an event encountered by one thread to stop only that one thread's execution while all other threads remain executing. This form of debugging is referred to as non-stop debugging. Non-stop debugging is a bit of a misnomer, however, in that some threads actually do stop execution. The primary difference between non-stop and all stop debugging, is that in non-stop debugging execution of all threads of a multi-threaded program need not be stopped upon a single thread encountering an event, while in all-stop debugging execution of all threads is stopped upon a single thread of the multi-threaded application encountering an event. While non-stop debugging provides many benefits, non-stop debugging also presents many challenges.

SUMMARY OF THE INVENTION

Methods, apparatus, and products for event management in a non-stop debugging environment are disclosed in this specification. The non-stop debugging environment includes a debugger configured to debug a debuggee. The debuggee includes a number of threads of execution. In the non-stop debugging environment, encountering an event by one of the threads stops execution of only the one thread without concurrently stopping execution of other threads. Event management in the non-stop debugging environment in accordance with embodiments of the present invention includes receiving, by the debugger, a user request to establish a dynamically disabled event that is disabled for all threads upon a stop in execution of any thread; establishing, by the debugger, the dynamically disabled event; identifying, by the debugger, a stop in execution of a particular thread; and disabling, by the debugger, the dynamically disabled event for all threads of the debuggee.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
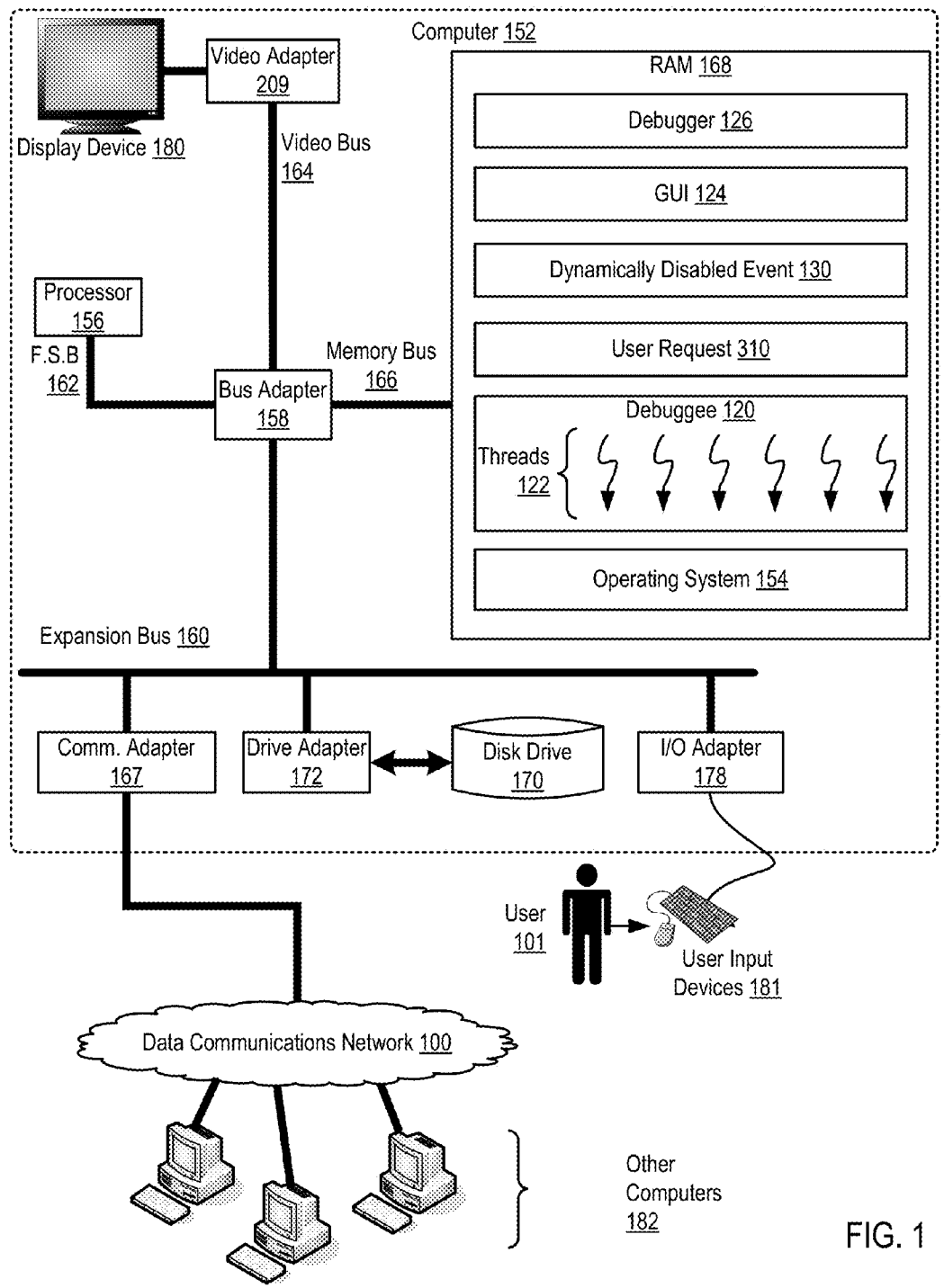
FIG. 1 sets forth a block diagram of a system for event management in a non-stop debugging environment according to embodiments of the present invention.

Exemplary methods, apparatus, and products for event management in a non-stop debugging environment in accordance with the present invention are described with reference to the accompanying drawings, beginning with FIG. 1. FIG. 1 sets forth a block diagram of a system for event management in a non-stop debugging environment according to embodiments of the present invention. The system of FIG. 1 includes automated computing machinery comprising an exemplary computer (152) useful in event management in a non-stop debugging environment according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) are a debugger (126) and a debuggee (120). A debugger (126) is an application that controls operation of another application—the debuggee (120)—for the purpose of testing execution of the debuggee. The source code of the debuggee may run on an instruction set simulator (ISS), a technique that allows great power in its ability to halt when specific conditions are encountered but which will typically be somewhat slower than executing the code directly on a processor for which the code is written. When execution of a program crashes or reaches a preset condition, a debugger typically displays the position in the source code at which the execution of the program crashed. A 'crash' occurs when the program cannot normally continue because of a programming bug. In addition to displaying a position in source code when execution of the source code crashes, debuggers also often offer other functions such as running a program step by step (single-stepping or program animation), stopping, breaking, or pausing the program to examine the current state, at some event or specified instruction by means of a breakpoint, and tracking the values of some variables.

In the example system of FIG. 1, the debugger (126) presents a graphical user interface (124) as a front-end of the debugger (126). Front-ends are extensions to debugger engines that provide Integrated Development Environment ('IDE') integration, program animation, and visualization features, rather than console-based command line interfaces. The 'front-end' directly faces a client—or user—in contrast to the debugger (126) in the example of FIG. 1, which interfaces indirectly with the clients through the GUI (124).

In the example system of FIG. 1, the debuggee (120) is a software application that executes as a process containing a number of threads (122) of execution. A 'thread' of execution as the term is used here refers to the smallest unit of processing that can be scheduled by an operating system. A thread generally results from a fork of a computer program into two or more concurrently running threads. The implementation of threads and processes differs from one operating system to another, but in most cases, a thread is contained inside a process. Multiple threads can exist within the same process and share resources such as memory, while different processes do not share these resources. In particular, the threads of a process share the process's computer program instructions and its context—the values that the process's variables reference at any given moment.

The system of FIG. 1 includes a non-stop debugging environment that includes the debugger (126) and the debuggee (120). The debugger supports non-stop debugging by insuring that when one thread of a multi-threaded debuggee encounters an event, execution of only that one of threads stops, without concurrently stopping execution of other threads. Consider, for example, a multi-threaded debuggee that includes three threads. In a non-stop debug environment, when one of the threads encounters an event, execution of that thread is stopped, but execution of the remaining two threads continues unabated. Either of other two threads may then separately encounter an event, stopping execution of that thread, but no other thread. By contrast, a traditional all-stop debugging environment insures that all threads are stopped concurrently with any one thread encountering an event. Continuing with the above example of a triple threaded debuggee, when any one of the three threads encounters an event in a traditional all-stop debug environment, all three threads halt execution.

An event is a predefined occurrence during execution of a debuggee. Examples of events which may be encountered during execution of the debuggee include breakpoints, watchpoints, catchpoints, and the like. A breakpoint is a specification of a source code location at which a debuggee will pause or stop execution. A watchpoint is a breakpoint configured to pause or stop execution of the debuggee when a value of a particular expression changes. A catchpoint is another type of breakpoint configured to pause or stop execution of the debuggee when a specified event occurs such as the throwing of an exception or a load of a library, and so on.

In addition to supporting non-stop debugging, the debugger (126) in the example of FIG. 1 is also configured for event management in the non-stop debugging environment in accordance with embodiments of the present invention. As explained above, in a non-stop debugging environment when one thread stops executing other threads continue to execute. From time to time, therefore, when one thread is stopped—due to an event encounter, exception, or other reason—other threads may encounter previously established events, stopping execution. In this way, while a user of the debugger focuses on one stopped threads, other threads may begin to 'pile-up' on breakpoints, catchpoints, watchpoints, or the like. In some instances the piling-up of threads on events is undesirable as the stoppage in execution impacts application performance of the debuggee. Instead, the user (101) may desire that, while the user focuses on one stopped thread, the other threads continue to execute unabated. To that end, event management is carried in the non-stop debugging environment in accordance with embodiments of the present invention and includes receiving, by the debugger (126), a user request (310) to establish a dynamically disabled event (130). A dynamically disabled event (130) is an event configured to be disabled for all threads (122) upon a stop in execution of any thread. The debugger (126), responsive to the user request (310) may then establish the dynamically disabled event (130); identify a stop in execution of a particular thread; and disable the dynamically disabled event (130) for all threads of the debuggee.

Also stored in RAM (168) is an operating system (154). Operating systems useful in computers that carry out event management in a non-stop debugging environment according to embodiments of the present invention include UNIX™, Linux™, Microsoft XP™, AIX™, IBM's i™, and others as will occur to those of skill in the art. The operating system (154), debugger (126), debuggee (126), and GUI (124) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers that operate for event management in a non-stop debugging environment according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user (101) input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for event management in a non-stop debugging environment according to embodiments of the present invention include modems for wired dial-up communications, Ethernet (IEEE 802.3) adapters for wired data communications network communications, and 802.11 adapters for wireless data communications network communications.

The arrangement of computers, networks, and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
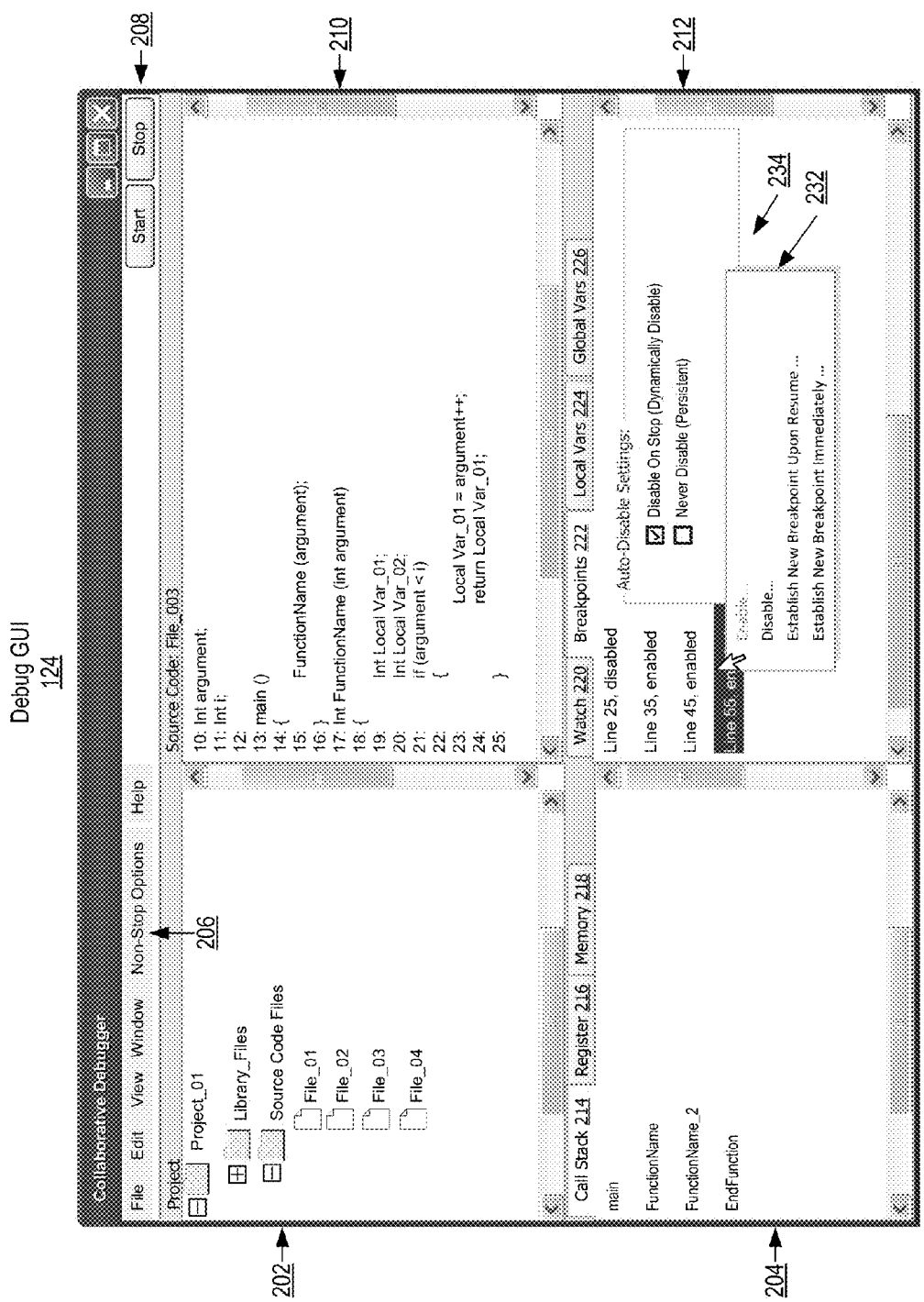
FIG. 2 sets forth an example non-stop debugging GUI presented to a user in accordance with embodiments of the present invention.

For further explanation, FIG. 2 sets forth an example non-stop debugging GUI (124) presented to a user in accordance with embodiments of the present invention. The example GUI (124) of FIG. 2 provides an interface for a user to control operation of a debugger that supports non-stop debugging. The debugger presenting the example GUI (124) of FIG. 2 is configured to debug a multi-threaded debuggee. That is, the debugger presenting the example GUI (124) of FIG. 2 and the multi-threaded debuggee form a non-stop debugging environment.

The example GUI (124) of FIG. 2 includes a menu bar (208) that, in turn, includes a number of separate menus: a File menu, an Edit menu, a View menu, a Non-Stop Options menu, and a Help menu. The Non-Stop Options menu (206), when selected, may provide a user with various menu items that support non-stop debugging.

The example GUI (124) of FIG. 2 also includes several independent portions—called panes (as in 'window panes') for clarity of explanation—a project pane (202), a source code pane (210), and two separate data panes (204, 212). Project pane (202) presents the files and resources available in a particular software development project. Source code pane (210) presents the source code of the multi-threaded debuggee. The data panes (204, 212) present various data useful in debugging the source code. In the example of FIG. 2, data pane (204) includes four tabs, each of which presents different data: a call stack tab (214), a register tab (214), and a memory tab (218). Data pane (212) includes four tabs: a watch list tab (220), a breakpoints (222) tab, a local variable tab (224), and a global variable tab (226).

The GUI (124) of FIG. 2 may support event management in a non-stop debugging environment in accordance with embodiments of the present invention. In the GUI (124) in the example of FIG. 2, a user has selected a breakpoint—at line 55—listed in the breakpoints tab (222). Upon selection, the GUI (124) is configured to display a settings panel (234) in which a user may specify whether the selected breakpoint is dynamically disabled or persistent. In the example of FIG. 2, the user has set the selected breakpoint at line 55 to be a dynamically disabled breakpoint. Upon such a setting, the GUI (124) may be configured to generate and provide a command to the back-end debugger (debug engine of the debugger) to set one or more attributes of the breakpoint to be disabled upon a stop in execution of any thread. Consider, for purposes of explanation only not limitation, an example of such a command "stop at 55 persistence=DisableOnStop." By contrast, when a user selects a persistent setting in the settings pane (234), the GUI (124) may generate a command such as "stop at 55 persistence=Always."

As explained above, in a non-stop debugging environment threads may pile-up on events while one thread is stopped, thereby impacting overall operational performance of the debuggee application. In the same way, threads may pile-up on event as soon as the event is established. Typically, a user requests for an event to be established while at least one thread is stopped. The event to be established in some cases may be related to the stopped thread. If a debugger is configured to establish the requested event immediately (or nearly so) upon the user's request to establish the event, in a non-stop debugging environment, any executing threads may begin to encounter the event. To that end, a debugger configured for event management in accordance with embodiments of the present invention, such as those described below with respect to FIG. 4, may be configured to receive a user request to establish a dynamically disabled event only upon resuming execution of a stopped thread and may then establish the dynamically disabled event upon resuming execution of a stopped thread. The example GUI (124) of FIG. 2 supports such a delayed establishment of an event. In the example of FIG. 2, the GUI (124) in response to a user's alternate-click (right mouse-click) may display a drop-down selection list (232) with several event-related options. In the example of FIG. 2, the drop-down selection list (232) includes an option to disable the currently selected breakpoint, an option to establish a new breakpoint upon resuming execution of the presently stopped thread, an option to establish a breakpoint immediately. Selection of the option to establish a new breakpoint upon resume, may prompt the GUI (124) to request, from the user, a location at which to insert a breakpoint as well as various other attributes. The GUI (124) may then generate a command to establish the breakpoint, but may provide the command only upon the user's resumption of execution of a stopped thread.

Readers of skill in the art will recognize that the setting pane (234) is but one example among many possible examples in which a debugger may provide, to the user through the GUI, means for specifying an event to be established as one of a dynamically disabled event or a persistent event. Readers of skill in the art will also recognize that the drop-down selection list (232) is but one way among many possible ways that debugger may provide, to the user through the GUI, means for specifying an event to be established immediately or only upon resuming execution of a stopped thread.

The GUI items, menus, window panes, tabs, and so on depicted in the example GUI (124) of FIG. 2, are for explanation, not for limitation. Other GUI items, menu bar menus, drop-down menus, list-boxes, window panes, tabs, and so on as will occur to readers of skill in the art may be included in GUIs presented by a debugger in a system configured for non-stop debugging in accordance with embodiments of the present invention.

Figure 3:
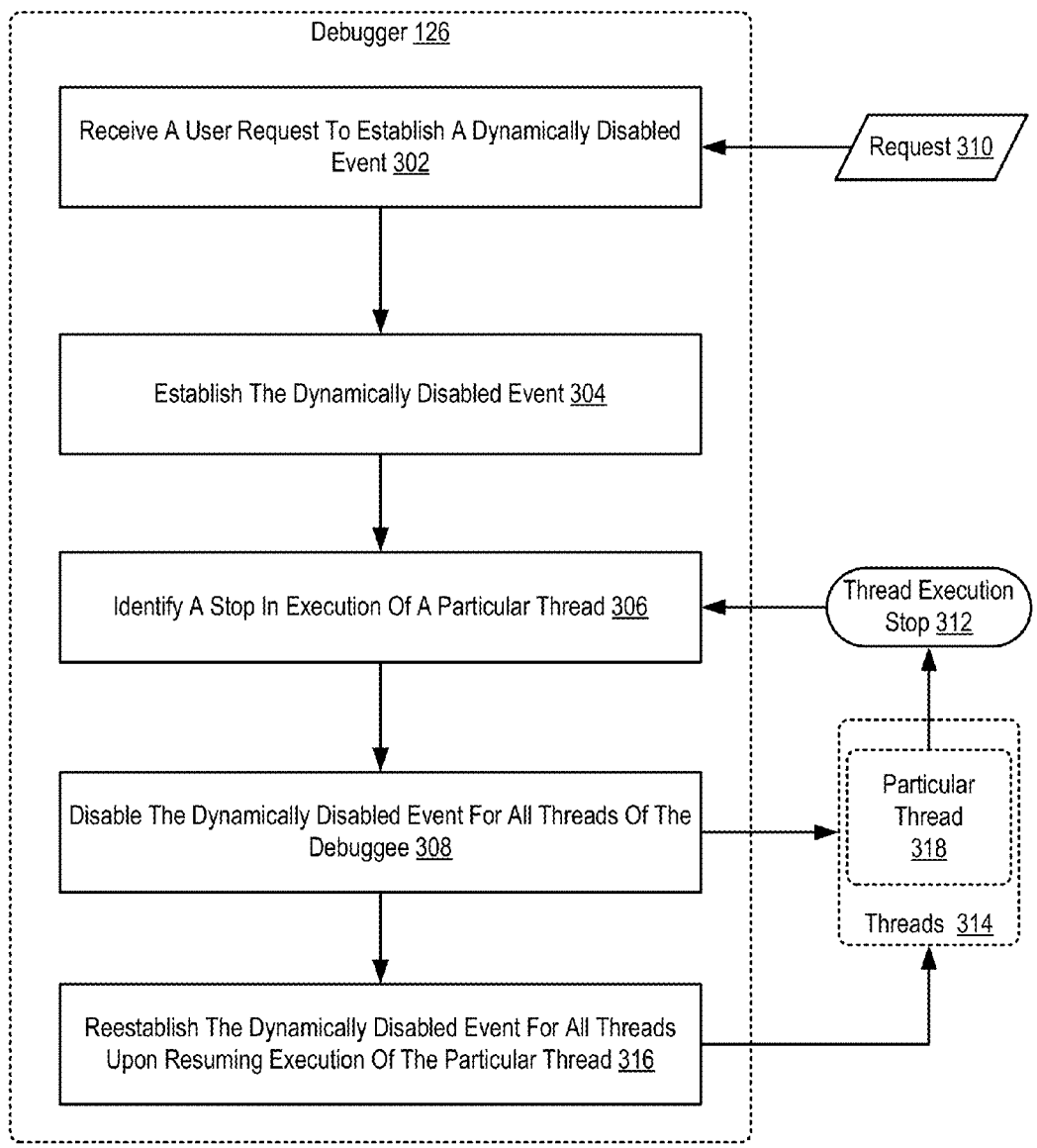
FIG. 3 sets forth a flow chart illustrating an exemplary method of event management in a non-stop debugging environment according to embodiments of the present invention.

For further explanation, FIG. 3 sets forth a flow chart illustrating an exemplary method of event management in a non-stop debugging environment according to embodiments of the present invention. The non-stop debugging environment of FIG. 3 includes a debugger (126) configured to debug a multi-threaded debuggee. In the non-stop debugging environment, encountering an event by one of threads stops execution of only the one thread without concurrently stopping execution of other threads.

The method of FIG. 3 includes receiving (302), by the debugger (126), a user request (310) to establish a dynamically disabled event that is disabled for all threads upon a stop in execution of any thread. Receiving (302) a user request (310) to establish a dynamically disabled event may be carried out in various ways including receiving a command from a debug to set an attribute of an event to indicate the event is a dynamically disabled event, where the GUI generates the command responsive to interaction with a user.

The method of FIG. 3 also includes establishing (304), by the debugger (126), the dynamically disabled event. Establishing (304) the dynamically disabled event may be carried out in various ways including, for example, by inserting in a memory location of a line of source code at which the event is to be established, a predefined opcode or other predefined value. The predefined opcode may cause an exception during execution of the portion of source code that is handled by the debugger or directly call one or more debugger functions during execution, thereby transferring execution control over to the debugger. In addition to storing the predefined opcode at the location in source code, the debugger may also store the source code originally stored at that memory location in another memory location for later retrieval if necessary. In addition, the debugger may maintain a list, or other example data structure, of event identifiers along with a value of an attribute indicated whether the event is a dynamically disabled event.

The method of FIG. 3 also includes identifying (306), by the debugger (126), a stop (312) in execution of a particular thread (318). A 'stop in execution' may occur for reasons. A thread, for example, may encounter an event—a dynamically disabled event or otherwise—may cause an execution exception, or may enter a wait state, such as when waiting on a mutex or semaphore. Identifying (306), by the debugger (126), a stop (312) in execution of a particular thread (318) may be effected with ptrace type system calls in which one process, the debugger, may observer and control execution of another process—the debuggee.

The method of FIG. 3 also includes disabling (308), by the debugger, the dynamically disabled event for all threads (314) of the debuggee. Disabling the event may be carried out by determining whether the event is a dynamically disabled event and if the event is a dynamically disabled event, replacing the predefined opcode stored at the memory location of the event with the original source code that was removed when the event was established. Upon resuming execution of the stopped thread, the method of FIG. 3 continues by reestablishing (316) the dynamically disabled event for all threads upon. In this way, when one thread stops, other threads which continue to execute cannot encounter the event.

Figure 4:
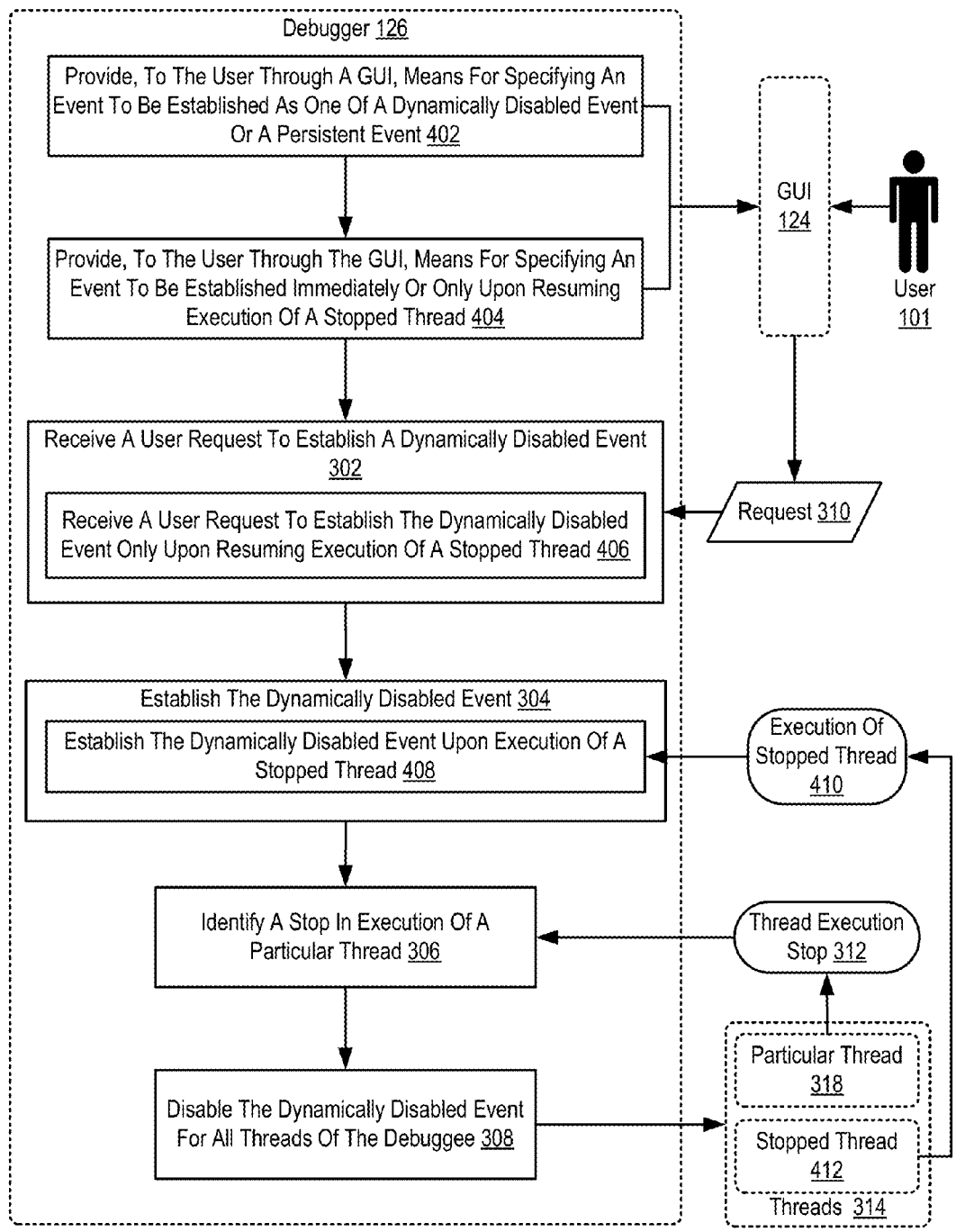
FIG. 4 sets forth a flow chart illustrating a further exemplary method for event management in a non-stop debugging environment according to embodiments of the present invention.

For further explanation, FIG. 4 sets forth a flow chart illustrating a further exemplary method for event management in a non-stop debugging environment according to embodiments of the present invention. The method of FIG. 4 is similar to the method of FIG. 3 in that the non-stop debugging environment of the method of FIG. 4 also includes a debugger (126) configured to debug a multi-threaded debuggee, where encountering an event by one of threads stops execution of only the one thread without concurrently stopping execution of other threads. The method of FIG. 4 is also similar to the method of FIG. 3 in that the method of FIG. 4 includes receiving (302) a user request (310) to establish a dynamically disabled event; establishing (304) the dynamically disabled event; identifying (306) a stop (312) in execution of a particular thread (318); and disabling (308), by the debugger, the dynamically disabled event for all threads (314) of the debuggee.

The method of FIG. 4 differs from the method of FIG. 3, however, in that the method of FIG. 4 includes providing (402), by the debugger to the user (101) through a GUI (124), means for specifying an event to be established as one of a dynamically disabled event or a persistent event. In the method of FIG. 4, a persistent event is not disabled for all threads upon a stop in execution of any thread. Providing (402) means for specifying an event to be established as one of a dynamically disabled event or a persistent event may be carried out by presenting one or more GUI objects—buttons, toolbars, drop-down selection lists, checkboxes, and so on—with which a user may request an event to be established and specify one or more attributes of the event including, whether the event is a dynamically disabled event or, alternatively, whether the event is a persistent event. An example of such means—such GUI objects—is set forth in the GUI (124) depicted in FIG. 2.

The method of FIG. 4 also includes providing (404), by the debugger to the user through the GUI (124), means for specifying an event to be established immediately or only upon resuming execution of a stopped thread. An event established immediately is effective immediately. That is, threads executing at the time the event is requested to be established may encounter the event immediately. In the method of FIG. 4, however, an event may also be established only upon resuming execution of a stopped thread. In this manner, the actual establishment of the event—inserting predefined opcode at the memory location storing the source code at which the event is to be established—is carried out at a time after the request is made; seconds or even minutes later. In this way, impact of event encounters is limited between the time of the request and the actual establishment of the event.

In the method of FIG. 4, receiving (302) the user request (310) to establish the dynamically disabled event includes receiving (406) a user request to establish the dynamically disabled event only upon resuming execution of a stopped thread. The debugger (126) may receive (406) such a user request to establish the event only upon resuming execution of a stopped thread through means provided by the debugger to the user through the GUI (124). That is, the GUI may receive user input, generate a command, and provide the command to the debugger.

In the method of FIG. 4, establishing (408) the dynamically disabled event includes establishing (408) the dynamically disabled event upon execution of a stopped thread. Establishing (408) the dynamically disabled event upon execution of a stopped thread may be carried out in various ways. The GUI (124), may send a command to the back-end debugger to establish the command responsive to a user's indication that execution of a stopped thread is to be resumed. Alternatively, the GUI (124) may send a command to the back-end debugger at the time of the request (302) that indicates a delayed establishment and the back-end debugger may establish the event just prior to or just after resuming execution of a stopped thread.

Figure 5:
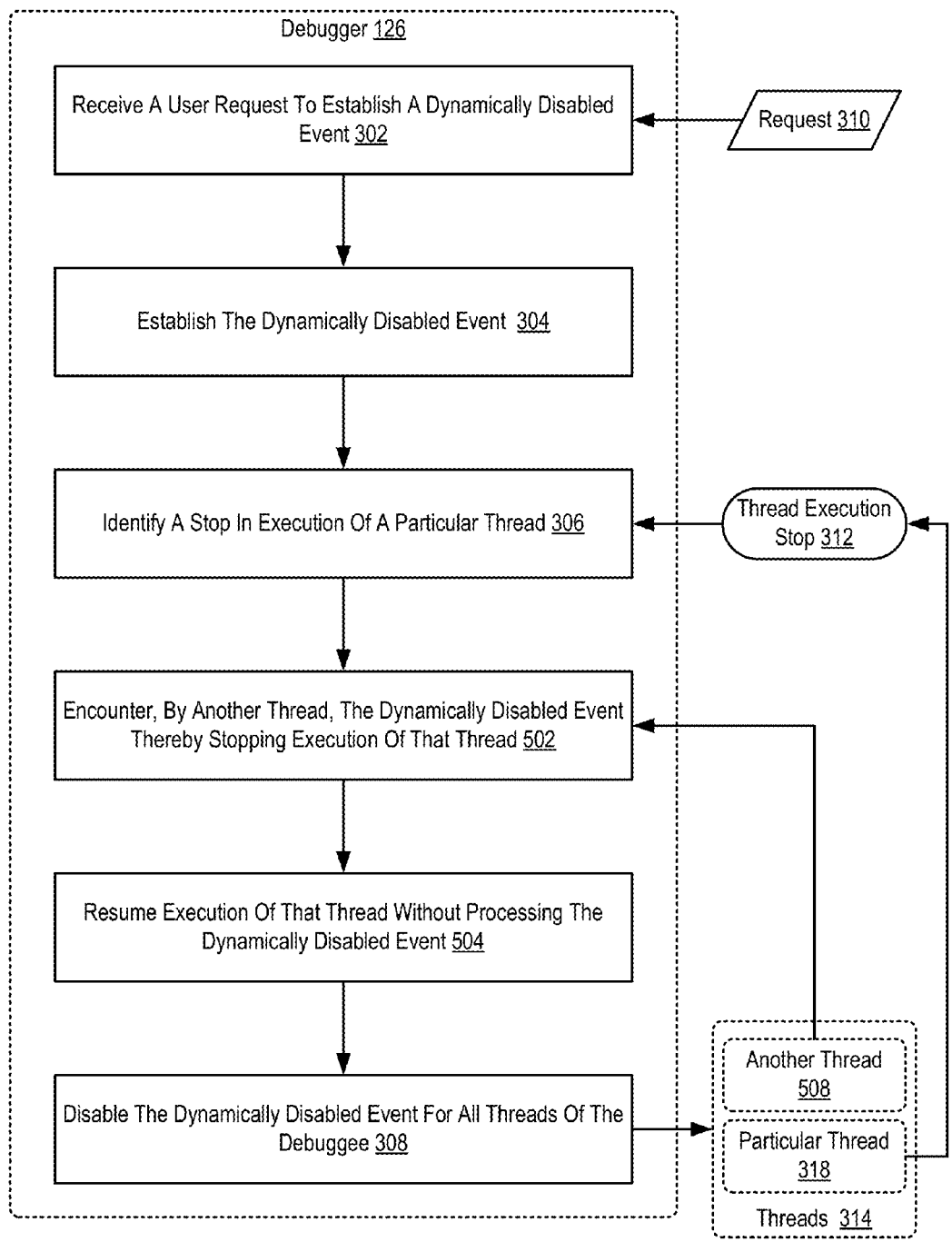
FIG. 5 sets forth a flow chart illustrating a further exemplary method for event management in a non-stop debugging environment according to embodiments of the present invention.

For further explanation, FIG. 5 sets forth a flow chart illustrating a further exemplary method for event management in a non-stop debugging environment according to embodiments of the present invention. The method of FIG. 5 is similar to the method of FIG. 3 in that the non-stop debugging environment of the method of FIG. 5 also includes a debugger (126) configured to debug a multi-threaded debuggee, where encountering an event by one of threads stops execution of only the one thread without concurrently stopping execution of other threads. The method of FIG. 5 is also similar to the method of FIG. 3 in that the method of FIG. 5 includes receiving (302) a user request (310) to establish a dynamically disabled event; establishing (304) the dynamically disabled event; identifying (306) a stop (312) in execution of a particular thread (318); and disabling (308), by the debugger, the dynamically disabled event for all threads (314) of the debuggee.

The method of FIG. 5 differs from the method of FIG. 3, however, in that the method of FIG. 5 includes prior to disabling (308) the dynamically disabled event for all threads of the debuggee but after identifying (306) the stop in execution of the particular thread (318): encountering (502), by another thread (508), the dynamically disabled event thereby stopping execution of that thread and resuming (504), by the debugger (126), execution of that thread (508) without processing the dynamically disabled event. FIG. 5 sets forth a race condition in which a first thread stops, prompting a dynamically disabled event to be disabled in all threads, but before the event can be disabled in every thread a second thread encounters the event. The debugger in the example of FIG. 5 is configured to automatically, without user interaction, resume (504) execution of that second thread and proceed with disabling (308) the dynamically disabled event.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable transmission medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable transmission medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable transmission medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An apparatus for event management in a non-stop debugging environment, the non-stop debugging environment comprising a debugger configured to debug a debuggee comprising a plurality of threads of execution, wherein encountering an event by one of the threads stops execution of only the one thread without concurrently stopping execution of other threads, the apparatus comprising a computer processor, a computer memory operatively coupled to the computer processor, the computer memory having disposed within it computer program instructions that, when executed by the computer processor, cause the apparatus to carry out the steps of:
- receiving, by the debugger, a user request to establish a dynamically disabled event that is disabled for all threads upon a stop in execution of any thread;
- establishing, by the debugger, the dynamically disabled event;
- identifying, by the debugger, a stop in execution of a particular thread; and
- disabling, by the debugger, the dynamically disabled event for all threads of the debuggee; wherein
- prior to disabling the dynamically disabled event for all threads of the debuggee and after identifying the stop in execution of the particular thread;
- encountering, by another thread, the dynamically disabled event thereby stopping execution of that thread; and
- resuming, by the debugger, execution of that thread without processing the dynamically disabled event.

2. The apparatus of claim 1, further comprising computer program instructions that, when executed, cause the apparatus to carry out the step of reestablishing the dynamically disabled event for all threads upon resuming execution of the particular thread.

3. The apparatus of claim 1, wherein:
- receiving the user request to establish the dynamically disabled event further comprises receiving a user request to establish the dynamically disabled event only upon resuming execution of a stopped thread; and
- establishing the dynamically disabled event further comprises establishing the dynamically disabled event upon execution of a stopped thread.

4. The apparatus of claim 1, further comprising computer program instructions that, when executed, cause the apparatus to carry out the step of providing, by the debugger to the user through a graphical user interface ('GUI'), GUI objects enabling a user to specify an event to be established as one of a dynamically disabled event or a persistent event, wherein a persistent event is not disabled for all threads upon a stop in execution of any thread.

5. The apparatus of claim 1, further comprising computer program instructions that, when executed, cause the apparatus to carry out the step of providing, by the debugger to the user through a graphical user interface ('GUI'), GUI objects enabling a user to specify an event to be established immediately or only upon resuming execution of a stopped thread.

6. A computer program product for event management in a non-stop debugging environment, the non-stop debugging environment comprising a debugger configured to debug a debuggee comprising a plurality of threads of execution, wherein encountering an event by one of the threads stops execution of only the one thread without concurrently stopping execution of other threads, the computer program product disposed upon a non-transitory computer readable medium, the computer program product comprising computer program instructions capable, when executed, of causing a computer to carry out the steps of:
- receiving, by the debugger, a user request to establish a dynamically disabled event that is disabled for all threads upon a stop in execution of any thread;
- establishing, by the debugger, the dynamically disabled event;
- identifying, by the debugger, a stop in execution of a particular thread; and
- disabling, by the debugger, the dynamically disabled event for all threads of the debuggee; wherein
- prior to disabling the dynamically disabled event for all threads of the debuggee and after identifying the stop in execution of the particular thread;
- encountering, by another thread, the dynamically disabled event thereby stopping execution of that thread; and
- resuming, by the debugger, execution of that thread without processing the dynamically disabled event.

7. The computer program product of claim 6, further comprising computer program instructions that, when executed, cause the computer to carry out the step of reestablishing the dynamically disabled event for all threads upon resuming execution of the particular thread.

8. The computer program product of claim 6, wherein:
- receiving the user request to establish the dynamically disabled event further comprises receiving a user request to establish the dynamically disabled event only upon resuming execution of a stopped thread; and
- establishing the dynamically disabled event further comprises establishing the dynamically disabled event upon execution of a stopped thread.

9. The computer program product of claim 6, further comprising computer program instructions that, when executed, cause the computer to carry out the step of providing, by the debugger to the user through a graphical user interface ('GUI'), GUI objects enabling a user to specify an event to be established as one of a dynamically disabled event or a persistent event, wherein a persistent event is not disabled for all threads upon a stop in execution of any thread.

10. The computer program product of claim 6, further comprising computer program instructions that, when executed, cause the computer to carry out the step of providing, by the debugger to the user through a graphical user interface ('GUI'), GUI objects enabling a user to specify an event to be established immediately or only upon resuming execution of a stopped thread.

11. The computer program product of claim 6 wherein the computer readable medium comprises a storage medium.

\* \* \* \* \*